United States Patent [19]
Tsunetomi et al.

[11] Patent Number: 6,160,474
[45] Date of Patent: Dec. 12, 2000

[54] TRANSMITTER CASING FOR A TIRE AIR PRESSURE WARNING APPARATUS

[75] Inventors: Seishi Tsunetomi, Gifu-ken; Setsuhiro Saheki, Gifu; Akira Momose, Hashima, all of Japan

[73] Assignee: Pacific Industrial Co., Ltd., Gifu-Ken

[21] Appl. No.: 09/390,249

[22] Filed: Sep. 3, 1999

[30] Foreign Application Priority Data

Sep. 7, 1998 [JP] Japan .................................. 10-251683

[51] Int. Cl.[7] .................................................. B60C 23/00
[52] U.S. Cl. ......................... 340/442; 340/447; 73/146.8
[58] Field of Search .................................... 340/442, 447; 73/146, 146.8, 146.4, 146.5

[56] References Cited

U.S. PATENT DOCUMENTS

| | | | |
|---|---|---|---|
| 4,048,614 | 9/1977 | Shumway | 340/447 |
| 5,798,689 | 8/1998 | Huang | 340/447 |
| 5,844,131 | 12/1998 | Gabelmann et al. | 73/146.8 |

*Primary Examiner*—Julie Lieu
*Attorney, Agent, or Firm*—Trask Britt

[57] ABSTRACT

A transmitter casing has an upper plate and a lower plate, which face each other. A rib is located to incline with respect to the lower plate between the upper plate and the lower plate. The rib prevents the tire from interfering to the casing if the tire is detached from the wheel. This enables smooth detaching of a tire from a wheel without interference with the transmitter, and to strengthen the casing of the transmitter.

13 Claims, 6 Drawing Sheets

TRANSMITTER CASING FOR A TIRE AIR PRESSURE WARNING APPARATUS

BACKGROUND OF THE INVENTION

The present invention relates to an apparatus that warns a driver of the abnormal tire inflation pressure. More specifically, the present invention pertains to a casing of a transmitter that is installed inside a tire for transmitting information concerning tire inflation pressure to a receiver in the vehicle.

A decrease of tire pressure lowers the performance of a vehicle. Therefore, drivers should be aware of an improper tire inflation pressure and take proper measures. Therefore, apparatuses for detecting the improper tire inflation pressure and warning the drivers have been suggested.

As shown in FIGS. 8 and 9, a prior art warning apparatus includes a transmitter 105 that transmits tire inflation pressure information to a receiver (not shown) in a vehicle. The transmitter 105 includes a box-shaped casing 103 and a valve stem 104 formed integrally on the casing 103. The casing 103 accommodates a pressure detector, a signal processing circuit, an electronic substrate, and a battery (not shown). An air hole 106 is formed in the casing 103. As shown in FIG. 9, the transmitter 105 is attached to a predetermined part of a wheel 12 such that the casing 103 is located inside a tire 9. Air is injected into the tire 9 from the valve stem 104 through the air hole 106. The valve stem 104 functions as an antenna for transmitting tire inflation pressure information.

FIG. 3 is a perspective view of a typical tire detaching apparatus 11. The tire detaching apparatus 11 includes a turn table having fixed hooks 14 and a roller 13, which is located above the turntable 15. The wheel 12 is fixed on the turntable 15 by the fixed hooks 14 and is rotated. In this state, the roller 13 is used to remove the tire 9 from the wheel 12.

As shown in FIG. 3, when the tire 9 is detached from the wheel 12, the roller 13 engages and pulls up a lower bead 9b of the tire 9 while the wheel 12 is rotated. However, as shown in FIGS. 8 and 9, the casing 103 of the prior art transmitter 105 has a peripheral wall 103a, which is perpendicular to the upper and lower surfaces of the casing 103. Accordingly, as shown by a broken line of FIG. 9, the lower bead 9b can contact the peripheral wall 103a when pulled up by the roller 13. This hinders the removal of the tire 9 and may damage the casing 103.

SUMMARY OF THE INVENTION

An objective of the present invention is to provide a transmitter casing of a tire inflation pressure warning apparatus that enables smooth detaching of a tire from a wheel without interference with the transmitter.

Another objective of the present invention is to strengthen the casing of the transmitter.

To achieve the above objectives, the present invention provides a case for a transmitter. The transmitter is attached to a wheel inside a tire and transmits information concerning tire pressure. The case comprises an inclined surface at the periphery of the case that facilitates removal of the tire from the wheel by guiding the tire over the case.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

One embodiment of the present invention will now be described with reference to FIGS. 1–7.

Figure 1:
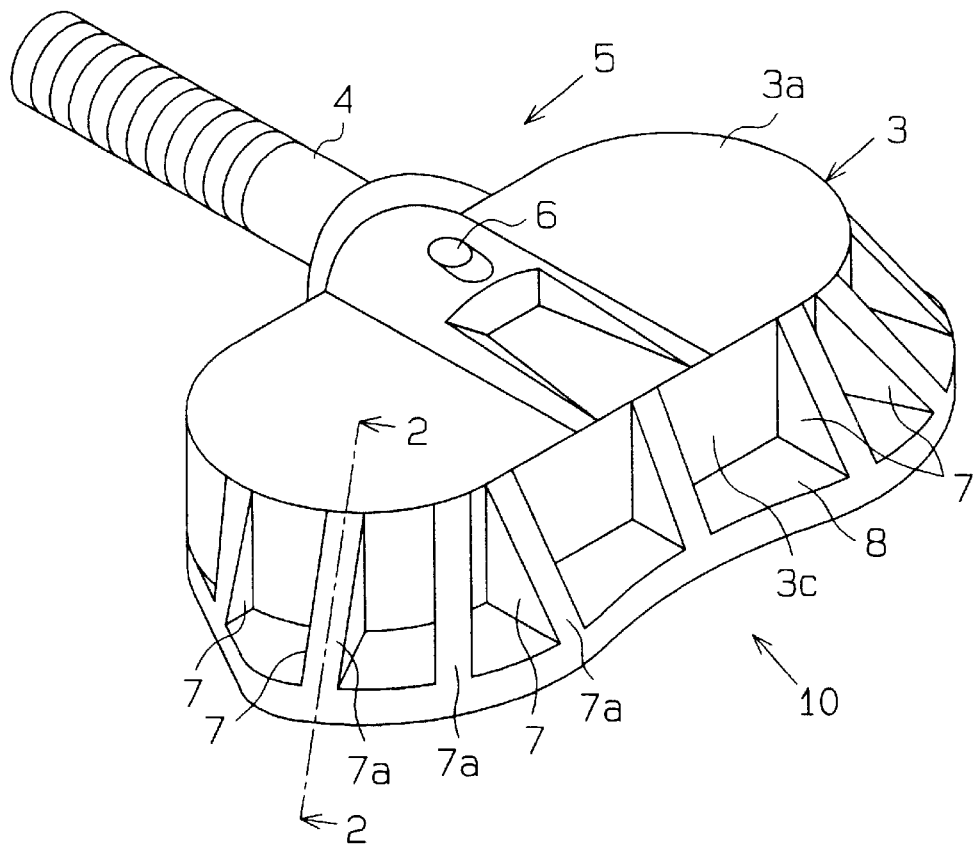
FIG. 1 is a perspective view of a transmitter of a tire inflation pressure warning apparatus according to a first embodiment of the present invention.
Figure 8:
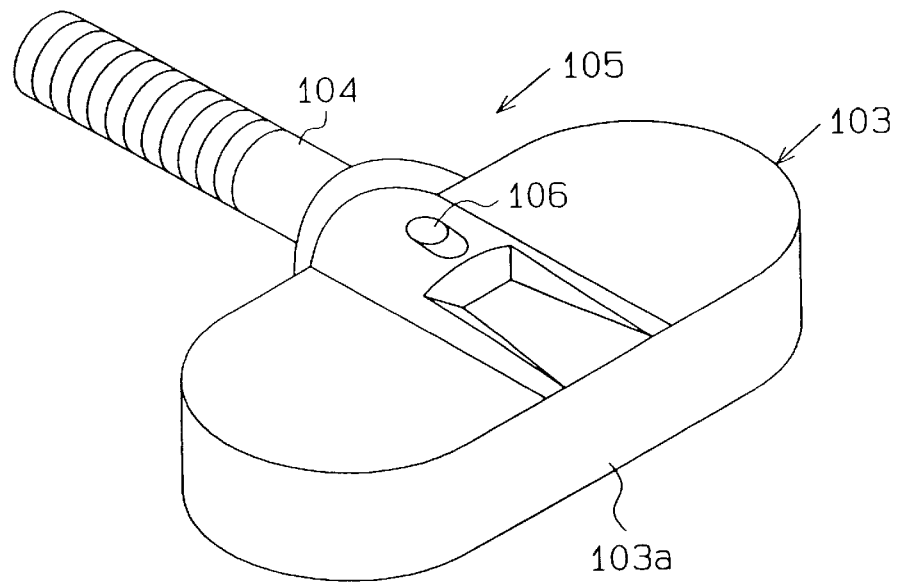
FIG. 8 is a perspective view of a prior art transmitter of a tire inflation pressure warning apparatus.

FIG. 1 shows a transmitter 5 for a tire inflation pressure warning apparatus according to one embodiment of the present invention. The transmitter 5 of the present embodiment has substantially the same structure as the prior art transmitter 105 of FIG. 8. That is, the transmitter 5 includes a box-shaped casing 3 and a valve stem 4, which is integrally formed on the casing 3. The casing 3 accommodates a pressure detector, a signal processing circuit, an electronic substrate, and a battery (not shown). An air hole 6 is formed in the upper surface of the casing 3. Like the prior art transmitter 105 of FIG. 9, the transmitter 5 is attached to a predetermined part of a wheel 12 such that the casing 3 is located inside a tire 9. Air is injected into the tire 9 from the valve stem 4 through the air hole 6. The valve stem 4 functions as an antenna for transmitting the tire inflation pressure of the tire 9. The transmitter 5 transmits the tire inflation pressure to a receiver (not shown) in a vehicle.

In the present embodiment, the casing 3 includes an upper plate 3a, a lower plate 3b, and a peripheral wall 3c. The upper plate 3a is parallel to the lower plate 3b, and the peripheral wall 3c connects the periphery of the upper plate 3a to the periphery of the lower plate 3b. A flange 8, which is parallel to the upper plate 3a, extends outward from the periphery of the lower plate 3b. Triangular reinforcement ribs 7 are formed between the flange 8 and the peripheral wall 3c. The upper plate 3a or the lower plate 3b may be formed as a lid that is removably attached to the casing 3.

Figure 2:
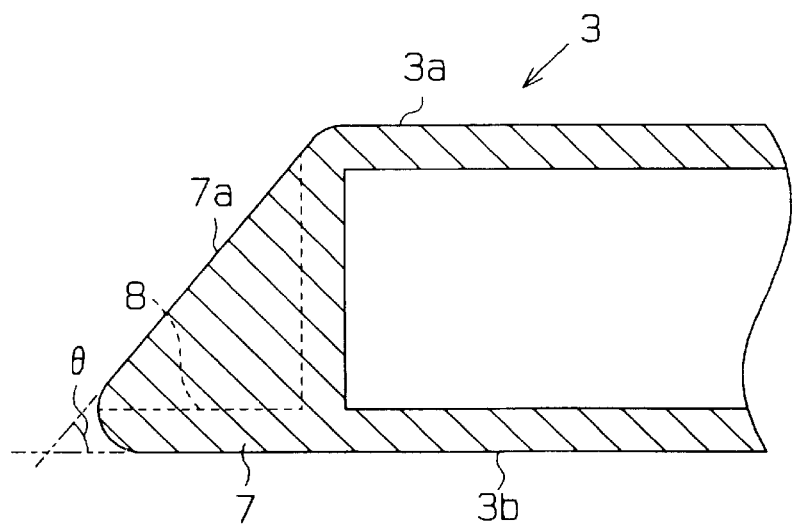
FIG. 2 is a partial sectional view taken on the line 2—2 of FIG. 1.
Figure 3:
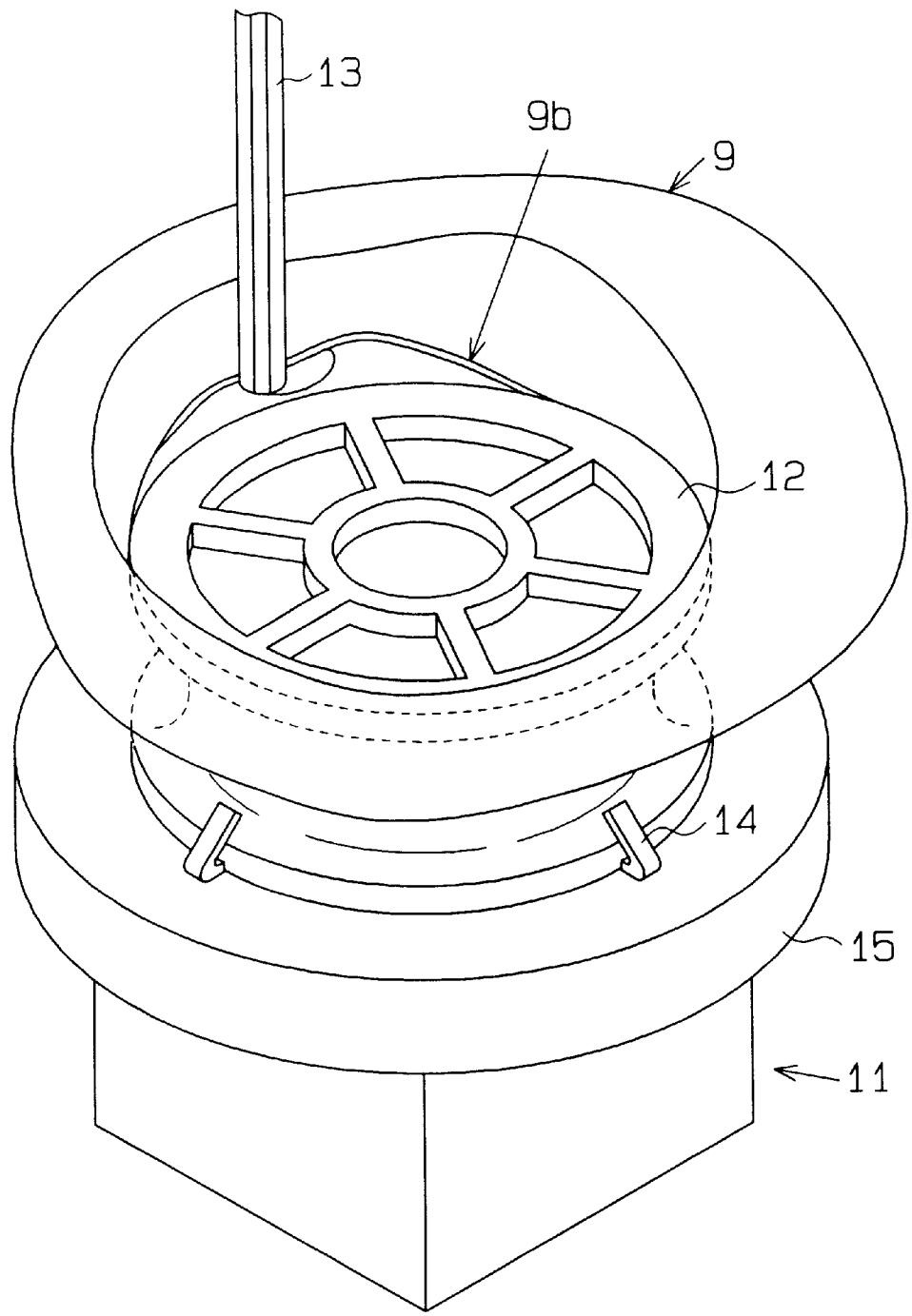
FIG. 3 is a perspective view of a tire detaching apparatus.

As shown in FIG. 2, each rib 7 has an inclined surface 7a, which is inclined at a predetermined angle θ with respect to the lower plate 3b. The ribs 7 and the flange 8 are not necessarily formed around the entire peripheral wall 3c. They may extend about a portion of the peripheral wall 3c. In FIG. 1, the ribs 7 and the flange 8 are formed around substantially half the perimeter of the peripheral wall 3c on the opposite side of the casing 3 that is opposed to the valve stem 4.

Figure 4A:
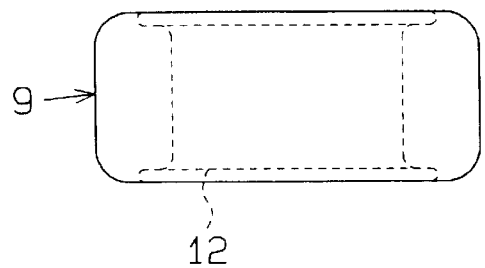
FIGS. 4(a)–4(d) show steps for detaching a tire.
Figure 4B:
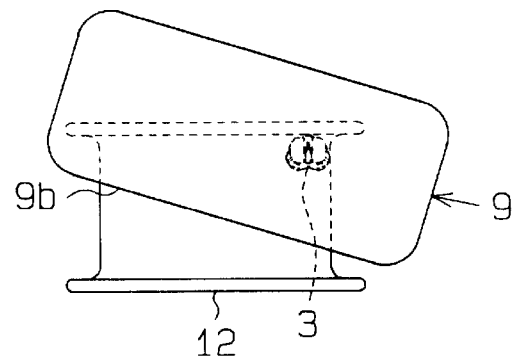
Figure 4C:
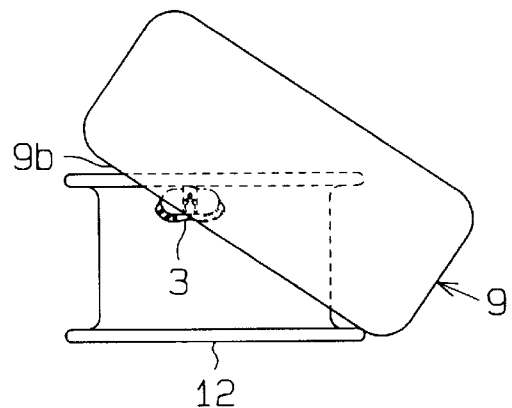
Figure 4D:
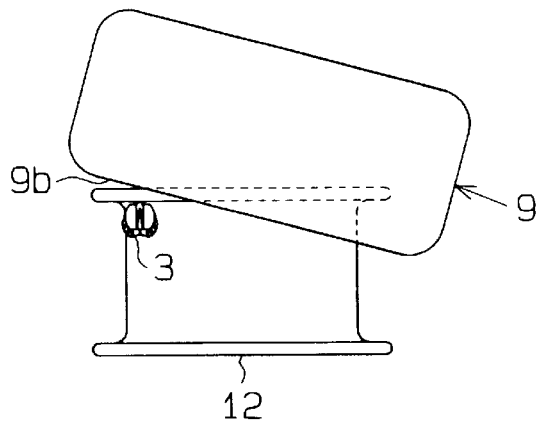
Figure 5:
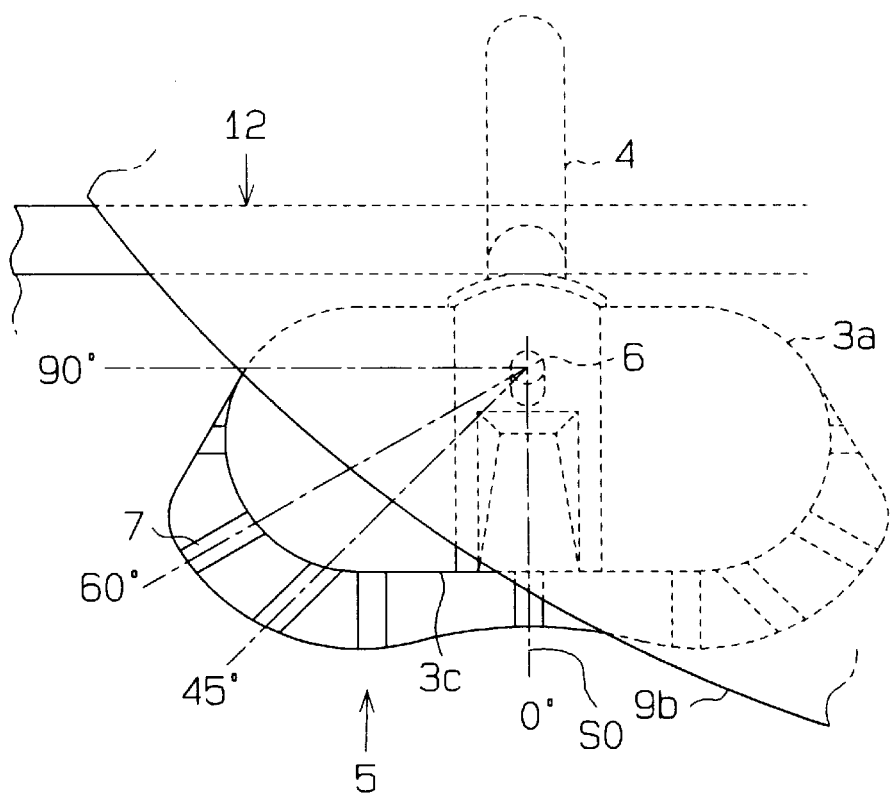
FIG. 5 is a partial enlarged view showing the position of the transmitter casing and the lower bead of the tire of FIG. 4(c)

A method for calculating the inclination angle θ of the inclined surface 7a of the ribs 7 will now be explained with reference to FIGS. 5–7. FIG. 5 corresponds to FIG. 4(c). As shown by FIGS. 4(c) and 5, when the tire 9 is detached from the wheel 12, the lower bead 9b contacts the transmitter 5 that is attached to the wheel 12. As shown in FIG. 5, the lower bead 9b slides over the transmitter 5 from a direction that is a 45–60 degrees from the line S0. The line S0 is parallel to the axis of the wheel 12 and passes through the air hole 6.

Figure 6:
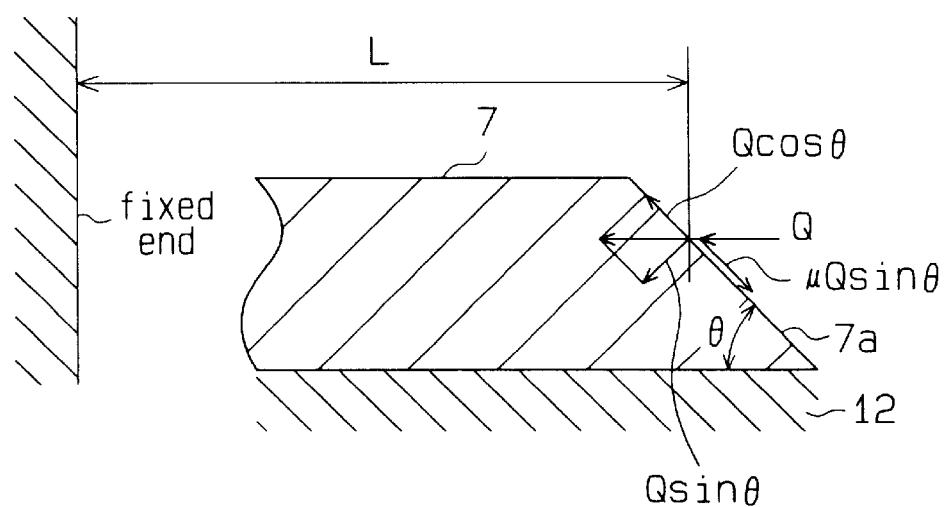
FIG. 6 is a dynamic model for calculating an optimum inclination angle of the inclined surface of the reinforcement ribs of the transmitter of FIG. 1.

FIG. 6 shows a dynamic model of each rib 7. When the lower bead 9b contacts the ribs 7, a force Q is applied to the inclined surface 7a of each rib 7. A bending moment applied to the fixed end of the transmitter 5 when the lower bead 9b slides over the inclined surface 7a is expressed by the following expression.

$$M = Q(\cos\theta - \mu\sin\theta) \times \sin\theta \times L$$

Figure 9:
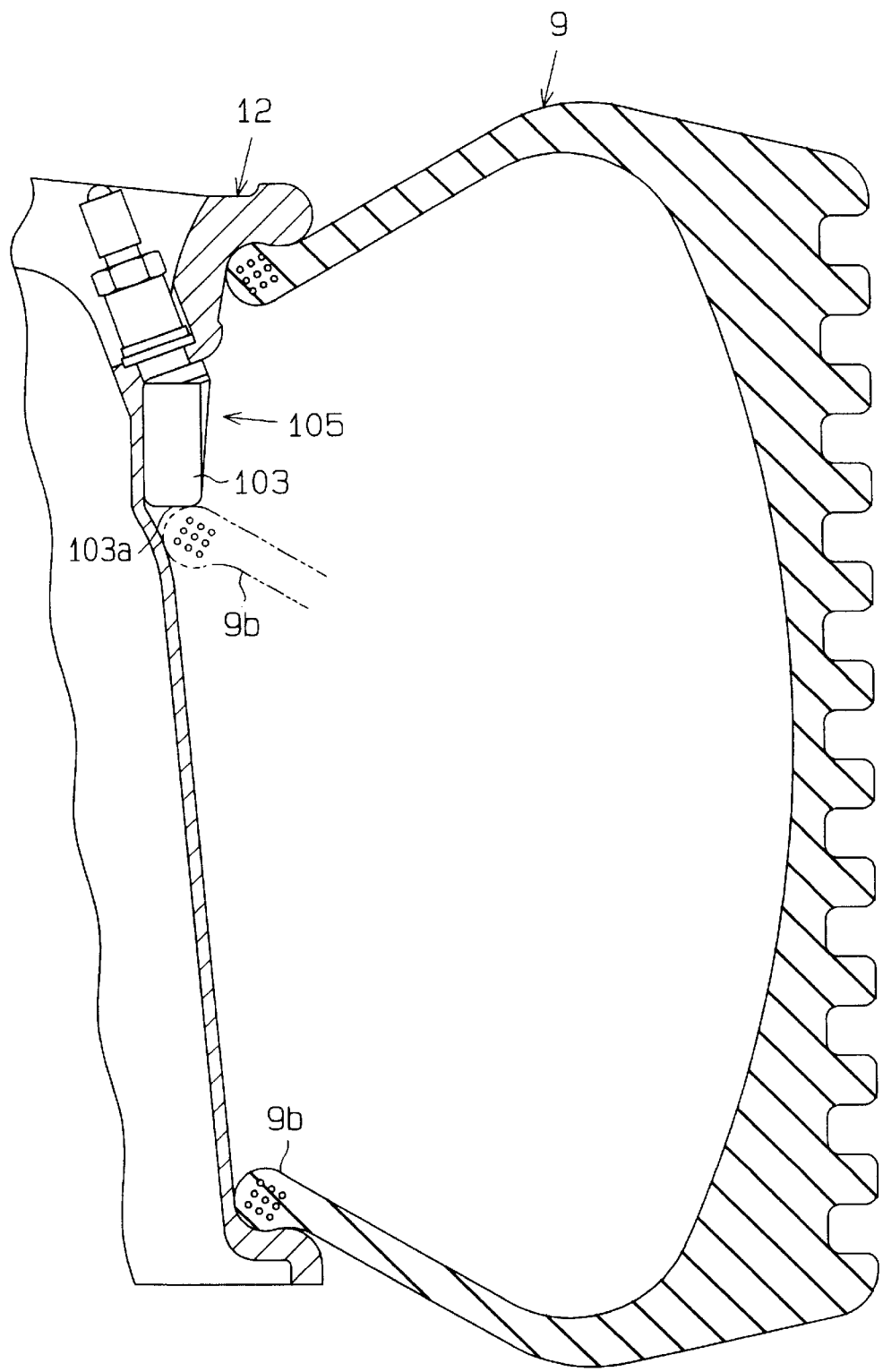
FIG. 9 is a cross sectional view showing the transmitter of FIG. 8 installed in a wheel.

In the above expression, θ is the inclination angle of the inclined surface 7a, L is the distance from the fixed end of the transmitter 5 to the contact point of the lower bead 9b with the inclined surface 7a, and μ is the coefficient of friction of the inclined surface 7a. The proximal end of the valve stem 4 is fixed to the wheel 12 as shown in FIG. 9. Accordingly, the fixed end of the transmitter 5 corresponds to the proximal end of the valve stem 4.

Figure 7:
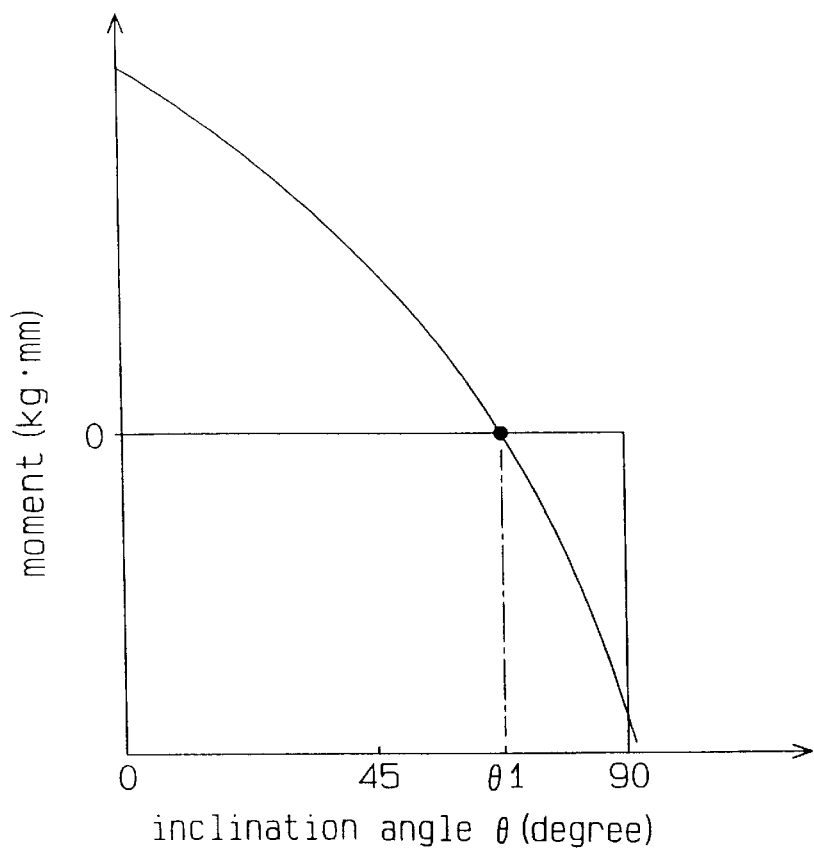
FIG. 7 is a graph showing the relation between a moment applied to the transmitter and the inclination angle of the reinforcement ribs in the dynamic model of FIG. 6.

FIG. 7 is a graph showing the relationship between the bending moment M and the inclination angle θ. The curve of FIG. 7 is determined by the above expression. θ1 of the curve is the inclination angle θ when the bending moment M is zero. When the inclination angle θ is smaller than θ1, the lower bead 9b can slide over the ribs 7. When the inclination angle θ is greater than θ1, the lower bead 9b cannot slide over the ribs 7.

In the present embodiment, the inclination angle θ of the ribs 7 that corresponds to the 45–60 degrees range (See FIG. 5) of the transmitter 5, which the lower bead 9b slides over, is 48 degrees. The ribs 7 outside the range of 45–60 degrees may have an inclination angle θ greater than 48 degrees. In other words, the ribs 7 over which the lower bead 9b slide may have a smaller inclination angle θ than the other ribs 7 so that the lower bead 9b is not hindered.

The optimum inclination angle θ of the ribs 7 is determined taking into consideration the rim shape of the wheel 12 and other conditions.

The illustrated embodiment has the following advantages.

The reinforcement ribs 7 are formed around the peripheral wall 3c of the casing 3. Accordingly, when the tire 9 is detached from the wheel 12, the lower bead 9b can slide over the inclined surface 7a of the ribs 7 and does not interfere with the casing 3. Therefore, the tire can be detached without damaging the casing 3. This improves the efficiency of detaching the tire 9. Also, the ribs 7 strengthen the casing 3.

The inclination angle θ of the ribs 7 should be relatively small so that the lower bead 9b easily slides over the ribs 7. In other words, the inclined surface 7a of each rib 7 should be gently sloped. To achieve this, the flange 8 and the ribs 7 must extend for a relatively great distance from the peripheral wall 7c, which increases the size of the transmitter 5. However, when only the ribs which the lower bead 9b is likely to contact have the relatively small inclination angle θ, the extension of the flange 8 and the ribs 7 is minimized. As shown in FIG. 1, the ribs 7 that are formed on an inner side 10 of the transmitter 5 that is opposite from the valve stem 4 have relatively great inclination angles θ and small extensions. This limits the size of the transmitter 5.

As shown in FIG. 9, the transmitter 105 is located in a relatively small space on the wheel 12. Therefore, the size of the new transmitter 5 has been limited so that the transmitter 5 can be installed on existing wheels 12 without problems. In other words, the transmitter 5 of the present embodiment can be installed on currently used wheels 12 without any changes to the wheels 12.

The present invention may be varied as follows.

The number and width of the ribs 7 may be varied. The ribs may be formed only on the part that the lower bead 9b contacts.

The inclined surface 7a of the ribs 7 of FIG. 1 may be curved.

The whole peripheral wall 3c may be the inclined surface θ without forming the ribs 7.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A case for a transmitter, wherein the transmitter is adapted for attachment to a wheel inside a tire and for transmitting information concerning tire pressure, the case comprising:

a first plate;

a second plate that is generally parallel to the first plate; and a plurality of ribs, wherein each rib is located at the periphery of the case and is located between the first plate and the second plate, wherein each ribs has an inclined surface, wherein the inclined surface of at least one of the ribs has a smaller angle of inclination with respect to the second plate than that of the other ribs, and wherein the inclined surface of the at least one rib is located to guide the tire over the case when the tire is being removed.

2. The case according to claim 1, wherein the at least one rib is generally triangular.

3. The case according to claim 1, wherein the periphery of the second late forms a flange, and the at least one rib is joined to the flange.

4. The case according to claim 3, wherein the case includes a peripheral wall that extends between the first and second plates, wherein the at least one rib extends between the peripheral wall and the flange.

5. The case according to claim 1, wherein the case includes a peripheral wall that extends between the first and second plates, wherein the at least one rib extends outwardly from the peripheral wall.

6. The case according to claim 1, wherein a valve stem extends from the case to the outside of the wheel.

7. A transmitter unit used for transmitting information concerning tire pressure from a wheel, the unit comprising:

a first plate;

a second plate that is generally parallel to the first plate;

a plurality of ribs extending from the unit, wherein each rib is located between the first plate and the second plate, wherein each rib has an inclined surface, wherein the inclined surface of at least one of the ribs has a smaller angle of inclination with respect to the second plate than that of the other ribs, wherein the inclined surface of the at least one rib is located to guide the tire over the case when the tire is being removed; and a valve stem extending from the unit.

8. The transmitter unit according to claim 7, wherein the at least one rib is generally triangular.

9. The transmitter unit according to claim 7, wherein the periphery of the second plate forms a flange, and the at least one rib is joined to the flange.

10. The case according to claim 9, wherein the case includes a peripheral wall that extends between the first and second plates, wherein the at least one rib extends between the peripheral wall and the flange.

11. The transmitter unit according to claim 7, wherein the transmitter unit includes a peripheral wall that extends between the first and second plates, wherein the at least one rib extends outwardly from the peripheral wall.

12. A case for a transmitter, wherein the transmitter is adapted for attachment to a wheel inside a tire and for transmitting information concerning tire pressure, the case comprising a first plate;

a second plate that is generally parallel to the first plate;

a peripheral wall that extends between the first and second plates; and a plurality of ribs, wherein each rib is located about the peripheral wall, wherein each rib has an associated inclined surface, wherein the inclined surface of at least one of the ribs has a smaller angle of inclination with respect to the second plate than that of the other ribs, and wherein the inclined surface of the at least one rib is located to guide the tire over the case when the tire is being removed.

13. A transmitter unit used for transmitting information concerning tire pressure from a wheel, the unit comprising:

a first plate;

a second plate that is generally parallel to the first plate;

a peripheral wall that extends between the first and second plates; and a plurality of ribs, wherein each rib is located about the peripheral wall, wherein each rib has an associated inclined surface, wherein the inclined surface of at least one of the ribs has a smaller angle of inclination with respect to the second plate than that of the other ribs, and wherein the inclined surface of the at least one rib is located to guide the tire over the case when the tire is being removed;

a valve stem extending from the unit; and an inclined surface formed on an inner side of the unit, wherein the inner side is opposite to the outer side.

* * * * *